(12) United States Patent
Tsai

(10) Patent No.: US 8,010,721 B2
(45) Date of Patent: Aug. 30, 2011

(54) UNIVERSAL SERIAL BUS DEVICE HAVING DRIVING PROGRAM

(75) Inventor: Ying-Chuan Tsai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 94 days.

(21) Appl. No.: 12/564,057

(22) Filed: Sep. 22, 2009

(65) Prior Publication Data

US 2011/0016241 A1    Jan. 20, 2011

(30) Foreign Application Priority Data

Jul. 17, 2009  (CN) .......................... 2009 1 0304466

(51) Int. Cl.
*G06F 13/12* (2006.01)
(52) U.S. Cl. .......................................... 710/62; 710/74

(58) Field of Classification Search .................... 710/62, 710/74
See application file for complete search history.

(56) References Cited

U.S. PATENT DOCUMENTS

| | | | |
|---|---|---|---|
| 2005/0210463 A1* | 9/2005 | Abe | 717/174 |
| 2006/0103453 A1* | 5/2006 | Pisasale et al. | 327/541 |
| 2007/0260763 A1* | 11/2007 | Kasama | 710/8 |

* cited by examiner

*Primary Examiner* — Alford Kindred
*Assistant Examiner* — David Martinez
(74) *Attorney, Agent, or Firm* — Altis Law Group, Inc.

(57) ABSTRACT

A universal serial bus (USB) device includes a USB interface, a storage unit storing driving programs of the USB device, and a microprocessor unit storing function programs of the USB device. When the USB device is connected to a computer via the USB interface, the microprocessor unit transfers the driving programs to the computer, and the microprocessor unit executes function programs of the USB device, to allow the USB device to communicate with the computer.

9 Claims, 2 Drawing Sheets

UNIVERSAL SERIAL BUS DEVICE HAVING DRIVING PROGRAM

BACKGROUND

1. Technical Field

The present disclosure relates to a universal serial bus (USB) device.

2. Description of Related Art

A computer system is usually connected to peripheral devices, such as a printer, a keyboard, and a mouse. When a peripheral device is first connected to the computer system, the computer system must detect the peripheral device and load a device driver to an operating system (OS) of the computer system from floppy disks or CD-ROMs. The device driver is a driving program that allows the peripheral device to communicate correctly with the computer system.

It costs money to store device drivers in floppy disks or on CD-ROMs. Furthermore, floppy disks or the CD-ROMs may be misplaced or damaged when installation is completed and so are not available if needed again.

DETAILED DESCRIPTION

Figure 1:
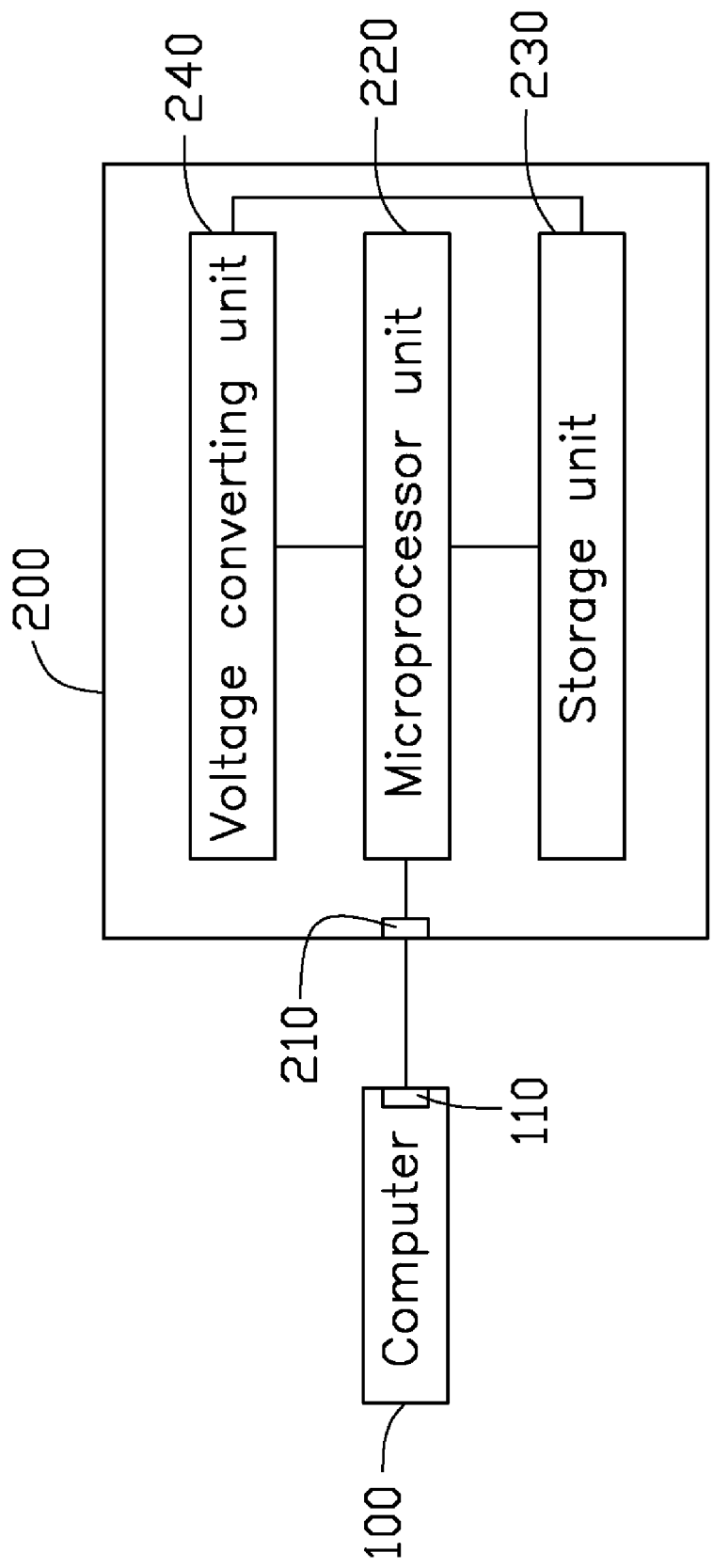
FIG. 1 is a block diagram of an embodiment of a USB device and a computer.

Referring to FIG. 1, an exemplary embodiment of a USB device 200 is capable of communicating with a computer 100 and includes a USB interface 210, a microprocessor unit 220, a storage unit 230, and a voltage converting unit 240. The computer 100 includes a USB interface 110 capable of connecting to the USB interface 210.

The storage unit 230 is configured to store a driving program of the USB device 200. The voltage converting unit 240 is configured to convert a +5 volt (V) voltage output from the USB interface 210 into a +3V voltage and provide it to the microprocessor unit 220 and the storage unit 230. The microprocessor unit 220 stores function programs of the USB device 200 therein and is configured to execute the function programs to control communication between the USB device 200 and the computer 100.

The USB interface 210 is connected to the microprocessor unit 220. The microprocessor unit 220 is connected to the storage unit 230 and the voltage converting unit 240. The storage unit 230 is connected to the voltage converting unit 240.

Figure 2:
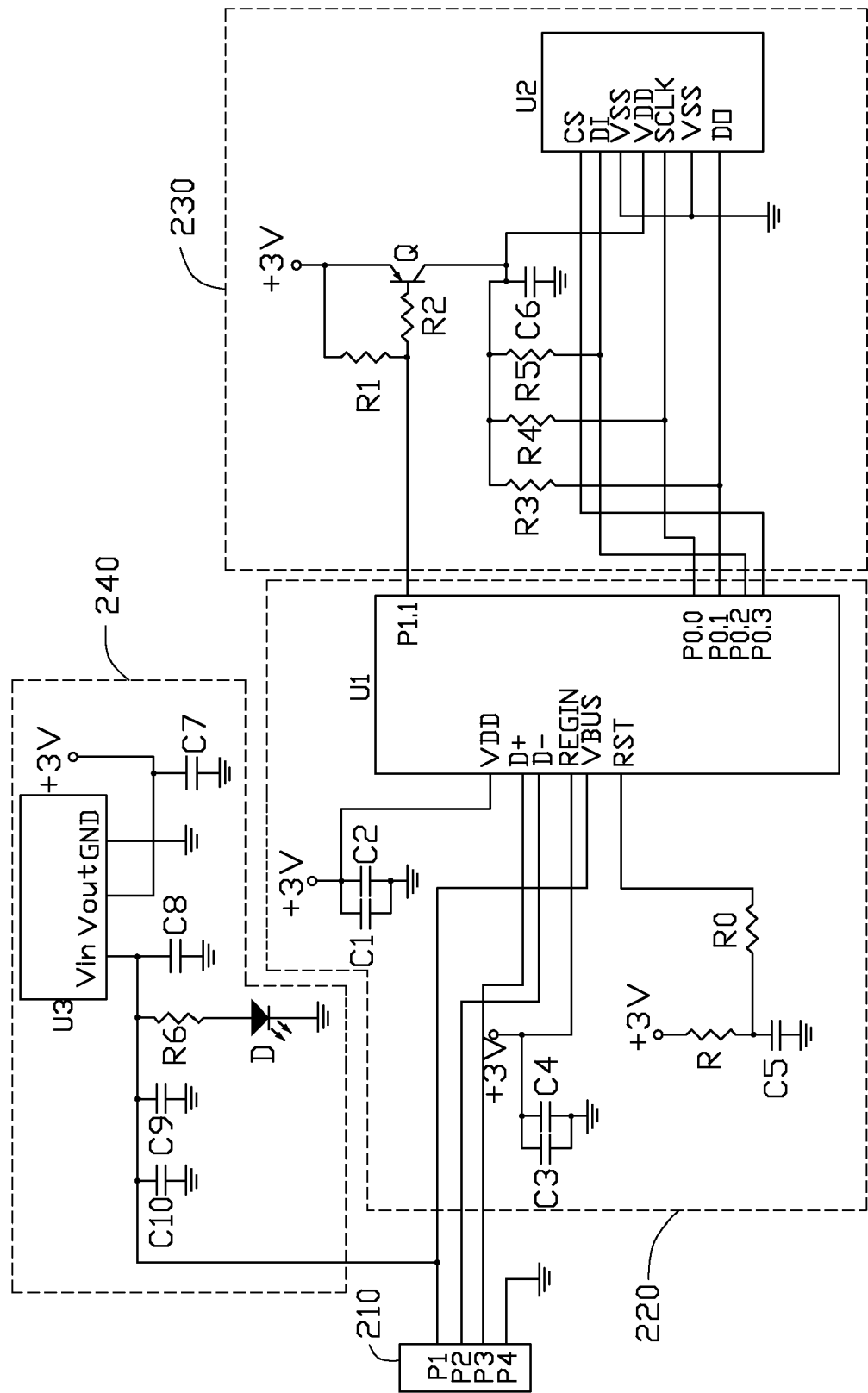
FIG. 2 is a circuit diagram of the USB device of FIG. 1, according to an embodiment.

Referring to FIG. 2, the USB interface 210 includes a power pin P1, two data pins P2, P3, and a ground pin P4. The microprocessor unit 220 includes a control chip U1, resistors R, R0, and capacitors C1-C5. The function programs of the USB device 200 are stored in the control chip U1. The power pin P1 of the USB interface 210 is connected to a detecting pin VBUS of the control chip U1. The data pins P2, P3 of the USB interface 210 are respectively connected to data pins D−, D+ of the control chip U1. The ground pin P4 of the USB interface 210 is grounded. A voltage pin VDD of the control chip U1 is connected to the +3V voltage output from the voltage converting unit 240 and grounded via the capacitor C1. The capacitors C1 and C2 are connected in parallel. A power pin REGIN of the control chip U1 is connected to the +3V voltage output from the voltage converting unit 240 and grounded via the capacitor C3. The capacitors C4 and C3 are connected in parallel. A reset pin RST of the control chip U1 is connected to the +3V voltage output from the voltage converting unit 240 via the resistors R0, R connected in sequence. There is a node between the resistor R0 and the resistor R, the capacitor C5 is connected between the node and ground. Input/output pins P0.0-P0.3, and P1.1 of the control chip U1 are connected to the storage unit 230. In one embodiment, the capacitors C1-C5 are used for filtering. The resistors R and R0 are used for limiting current. The capacitors C1-C5 and the resistor R0 can be omitted to save cost.

The storage unit 230 includes a storage chip U2, resistors R1-R5, a capacitor C6, and a transistor Q. The driving program of the USB device 200 is stored in the storage chip U2. A chip selecting pin CS of the storage chip U2 is connected to the input/output pin P0.3 of the control chip U1. A data input pin DI of the storage chip U2 is connected to the input/output pin P0.2 of the control chip U1 and connected to a first terminal of the capacitor C6 via the resistor R5. The first terminal of the capacitor C6 is connected to the collector of the transistor Q1. A second terminal of the capacitor C6 is grounded. A clock pin SCLK of the storage chip U2 is connected to the input/output pin P0.0 of the control chip U1 and connected to the first terminal of the capacitor C6 via the resistor R4. A data output pin DO of the storage chip U2 is connected to the input/output pin P0.1 of the control chip U1 and connected to the first terminal of the capacitor C6 via the resistor R3. Ground pins VSS of the storage chip U2 are grounded. A voltage pin VDD of the storage chip U2 is connected to the first terminal of the capacitor C6 and the collector of the transistor Q. The base of the transistor Q is connected to the input/output pin P1.1 of the control chip U1 via the resistor R2. The emitter of the transistor Q is connected to the +3V voltage output from the voltage converting unit 240. The resistor R1 is connected between the input/output pin P1.1 of the control chip U1 and the emitter of the transistor Q. In one embodiment, the resistors R1-R5 are used for limiting current, and the capacitor C6 is used for filtering. The resistors R1-R5 and the capacitor C6 can be omitted to save cost.

The voltage converting unit 240 includes a voltage converting chip U3, a light emitting diode (LED) D, a resistor R6, and capacitors C7-C10. A voltage input pin Vin of the voltage converting chip U3 is connected to the power pin P1 of the USB interface 210, and connected to an anode of the LED D via the resistor R6. The capacitors C8-C10 are connected in parallel between the voltage input pin Vin of the voltage converting chip U3 and ground. A cathode of the LED D is grounded. A voltage output pin Vout of the voltage converting unit 240 is capable of outputting the +3V voltage. A ground pin GND of the voltage converting chip U3 is grounded. In one embodiment, the capacitors C7-C10 are used for filtering. The LED D is used for indicating whether a voltage at the power pin P1 of the USB interface 210 reaches a required voltage (such as 5V). The resistor R6 is used for limiting current. The capacitors C7-C10, the resistor R6, and the LED D can be omitted to save cost.

In one embodiment, the control chip U1 is a single-chip, and the type of the control chip U1 is C8051F340, the storage chip U2 is a secure digital memory card (SD), and the type of the storage chip U2 is SDE915B, and the type of the voltage converting chip U3 is AIC1117A_33.

In use, the USB device 200 is connected to the computer 100 via the USB interface 210 and the USB interface 110. The voltage input pin Vin of the voltage converting chip U3 receives the 5V voltage output from the USB interface 110 of the computer 100 via the power pin P1 of the USB interface 210. If the voltage at the power pin P1 does not reach a required voltage (such as 5V), the USB device 200 does not work and the LED D does not light. When the voltage at the power pin P1 reaches the required voltage, the USB device 200 works normally and the LED D is lit up. The voltage converting chip U3 converts the 5V voltage to the 3V voltage to provide to the microprocessor unit 220 and the storage unit 230 via the voltage output pin Vout. When the computer 100 detects the USB device 200, a requirement signal is sent to the control chip U1 of the USB device 200. After receiving the requirement signal, the control chip U1 sends a description table (the description table according to USB protocol, includes information about the USB device, such as type, manufacturer, driving programs, and so on) to the computer 100. Then, the computer 100 sends a control instruction to the control chip U1. The control chip U1 outputs a low level signal to the transistor Q via the input/output pin P1.1. The transistor Q is turned on. The collector of the transistor Q outputs a high level signal to the storage chip U2. The control chip U1 reads out the driving programs from the storage chip U2 of the storage unit 230 via the input/output pin P0.1 and P0.2, and transfers the driving programs to the computer 100 via the USB interface 210. The computer 100 stores the driving programs in a virtual disk. The driving programs of the USB device 200 can be installed in the virtual disk. The computer 100 sends a work instruction to the control chip U1 after the driving programs are installed. The control chip U1 executes the function programs of the USB device 200. Therefore, the computer 100 can communicate with the USB device 200.

The USB device 200 stores the driving programs of the USB device 200 in the storage chip U2 of the storage unit 230, and transfers the driving program to the computer 100 after the USB device 200 is connected to the computer 100, and then the USB device 200 executes the function programs stored in the microprocessor unit 220. Therefore, the USB device 200 can communicate with the computer 100 and no separate media is required to store drivers on.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching. The embodiments were chosen and described in order to explain the principles of the disclosure and their practical application so as to enable others skilled in the art to utilize the disclosure and various embodiments and with various modifications as are suited to the particular use contemplated. Alternately embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A universal serial bus (USB) device, comprising:
    a USB interface;
    a storage unit comprising driving programs of the USB device stored therein;
    a microprocessor unit comprising function programs of the USB device stored therein, wherein when the USB device is connected to a computer via the USB interface, the storage unit transfers the driving programs to the computer to be installed, and the microprocessor unit executes the function programs of the USB device to allow the USB device to communicate with the computer; and
    a voltage converting unit to convert a voltage output from the USB interface of the USB device to provide to the microprocessor unit and the storage unit;
    wherein the microprocessor unit comprises a control chip, a first resistor, and a first capacitor, a power pin of the USB interface is connected to a detect pin of the control chip, data pins of the USB interface are correspondingly connected to data pins of the control chip, a voltage pin and a power pin of the control chip are connected to a voltage output from the voltage converting unit, a reset pin of the control chip is connected to the voltage output from the voltage converting unit via the first resistor and grounded via the first capacitor, input/output pins of the control chip are connected to the storage unit.

2. The USB device of claim 1, wherein the microprocessor unit further comprises second to fifth capacitors and a second resistor, the second capacitor is connected between the voltage pin of the control chip and ground, the third and the second capacitors are connected in parallel, the fourth capacitor is connected between the power pin of the control chip and ground, the fifth and the fourth capacitors are connected in parallel, the second resistor is connected between the reset pin of the control chip and the first resistor.

3. The USB device of claim 2, wherein the storage unit comprises a storage chip, and a transistor, a chip selecting pin, a data input pin, a clock pin, and a data output pin of the storage chip are respectively connected to the input/output pins of the control chip, a voltage pin of the storage chip is connected to the collector of the transistor, the base of the transistor is connected to an input/output pin of the control chip, the emitter of the transistor is connected to the voltage output from the voltage converting unit.

4. The USB device of claim 3, wherein the storage unit further comprises third to seventh resistors and a sixth capacitor, the third resistor is connected between the base and the emitter of the transistor, the fourth resistor is connected between the base of the transistor and the control chip, the fifth resistor is connected between the data output pin and the voltage pin of the storage chip, the sixth resistor is connected between the clock pin and the voltage pin of the storage chip, the seventh resistor is connected between the data input pin and the voltage pin of the storage chip, the sixth capacitor is connected between the voltage pin of the storage chip and ground.

5. The USB device of claim 4, wherein the voltage converting unit comprises a voltage converting chip, a voltage input pin of the voltage converting chip is connected to the power pin of the USB interface, a voltage output pin of the voltage converting chip outputs the converted voltage to the microprocessor unit and the storage unit.

6. The USB device of claim 5, wherein the voltage converting unit further comprises a light emitting diode (LED), an anode of the LED is connected to the voltage input pin of the voltage converting chip, a cathode of the LED is grounded.

7. The USB device of claim 6, wherein the voltage converting unit further comprises seventh to tenth capacitors and an eighth resistor, the eighth to the tenth capacitors are connected in parallel, and connected between the voltage input pin of the voltage converting chip and ground, the seventh capacitor is connected between the voltage output pin of the voltage converting chip and ground, the eighth resistor is connected between the voltage input pin of the voltage converting chip and the anode of the LED.

8. The USB device of claim 7, wherein the control chip is a single-chip.

9. The USB device of claim 7, wherein the storage chip is a secure digital memory card.

* * * * *